March 27, 1928. 1,663,800
J. KAUTZKY, JR
FREE SPOOL LEVEL WIND FISH REEL
Original Filed July 19, 1924
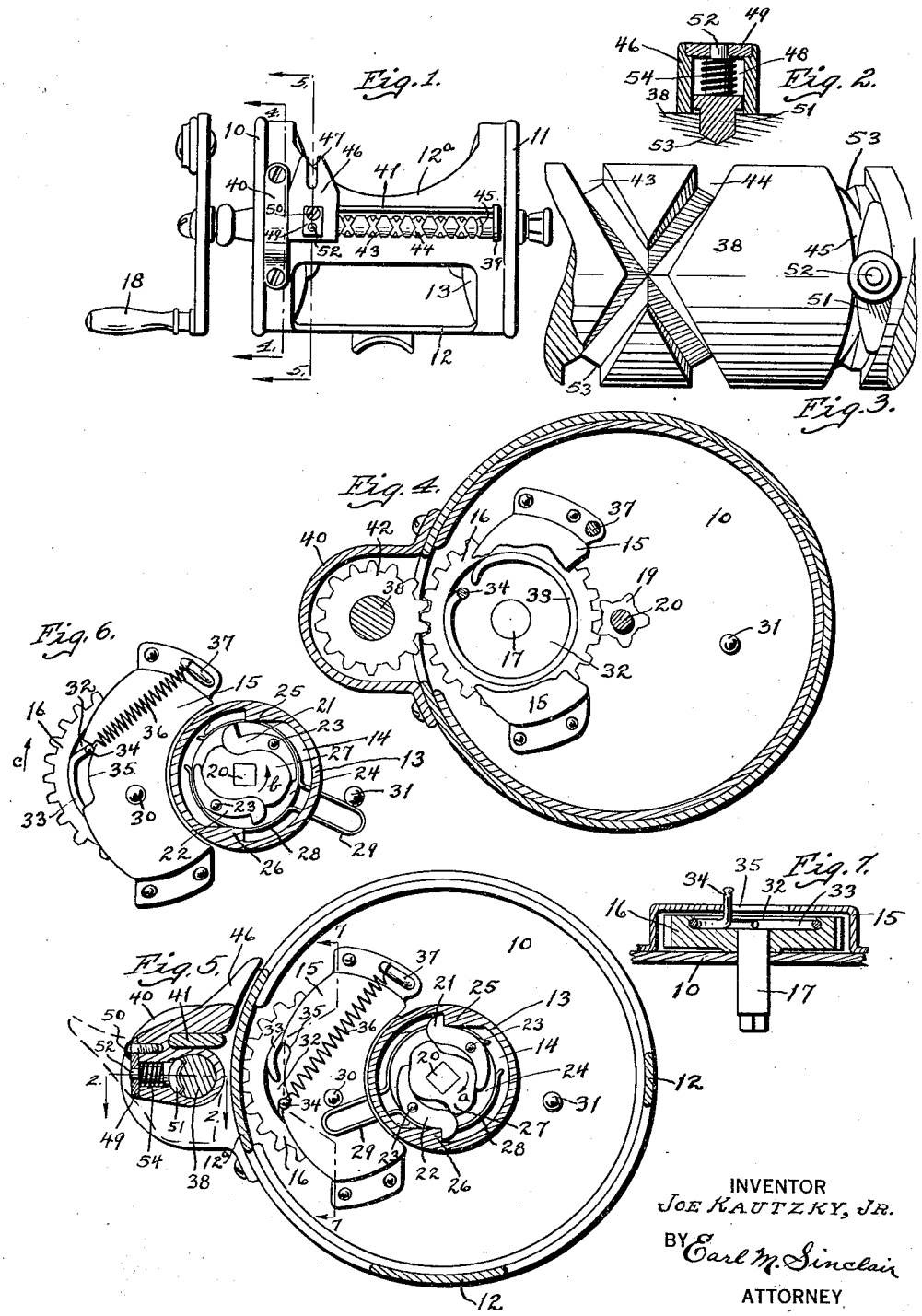
INVENTOR
JOE KAUTZKY, JR.
BY Earl M. Sinclair
ATTORNEY Patented Mar. 27, 1928.

1,663,800

UNITED STATES PATENT OFFICE.

JOE KAUTZKY, JR., OF FORT DODGE, IOWA.

FREE-SPOOL LEVEL-WIND FISH REEL.

Application filed July 19, 1924, Serial No. 727,075. Renewed March 23, 1927.

The object of this invention is to provide an improvement in free-spool level-wind fish reels, whereby the spool is automatically and positively released from the winding gear, and the line carriage instantly moved away from the line by spring action as soon as the crank is released to make a cast.

A further object of this invention is to provide an improved construction for a free-spool fish reel, providing a forced disengagement of the gears by an automatic backward snap of the crank through the action of a spring.

A further object of this invention is to provide an improved construction in level-wind reels in which the line carriage is positively forced forward out of the way of the line as soon as the crank is released for a cast, and dependence is not placed upon the paying-out movement of the line to accomplish such result.

A further object of this invention is to provide an improvement in level-wind reels in which the line carriage pawl is shaped to fit and conform to a V-shaped groove on the line carriage shaft and is thereby guided in its travel along said groove, thereby eliminating the tendency of said pawl to catch on a point and lock the device.

With these and other objects in view, my invention consists in the contruction, arrangement and combination of elements hereinafter set forth, pointed out in the claims and illustrated by the accompanying drawing, in which—

Figure 1 is a front elevation of a free-spool level-wind reel equipped with my improvements. Figure 2 is a detail section, on an enlarged scale, on the line 2—2 of Figure 5. Figure 3 is an elevation showing a portion of the doubly-spiral-grooved line carriage shaft and pawl adapted for travel therein, on an enlarged scale. Figure 4 is a cross-section on an enlarged scale on the line 4—4 of Figure 1. Figure 5 is a cross-section on the line 5—5 of Figure 1, showing the parts in position for operative engagement of the spool with the winding mechanism, and Figure 6 is a similar view showing the members in disengaged or free position. Figure 7 is a section taken substantially on the line 7—7 of Figure 5.

In the construction of the device as shown a skeleton cylindrical frame is provided consisting primarily of spaced disks or head plates 10, 11 connected by bars 12, other parts being employed which have nothing to do with the present invention and which are shown more or less conventionally. A spool 13 is suitably journaled for rotation within the skeleton frame and is adapted to receive a fishing line (not shown). In one end the spool 13 is formed with a cylindrical recess or counterbore 14 concentric with its axis. Fixed to the inner face of the disk or head 10, forwardly of the center thereof, is a bracket 15 within which a spur gear 16 is journaled for rotation, being fixed to a shaft 17 projecting through and having a bearing in said disk 10. The projecting end of the shaft 17 is squared as shown in Figure 7 and has attached thereto a hand crank 18. The gear 16 is in mesh with and adapted to drive a pinion 19 fixed to a shaft 20 journaled axially of the head 10 and projecting within and axially of the recess of the spool 13, within which recess the free spool mechanism, of common form, is located. Such mechanism consists, in this instance, of a pair of oppositely arranged pawls 21, 22, pivoted between their ends on pins 23 carried by a hub 24 mounted loosely on the shaft 20. The pawls 21, 22 each have at one end a portion adapted for engagement with a ratchet tooth or lug 25 or 26 formed at diametrically opposite points on the wall of the recess 14. A double-ended or cross-head cam 27 is mounted on and fixed to the inner end of the shaft 20 adjacent the inner face of the hub 24, between the pawls 21 and 22. The arrangement is such that when the crank 18 is turned forwardly by manual operation to wind the line on the spool 13, the cam 27 is turned in the direction of the arrow $a$ in Figure 5, through the gear 16, pinion 19 and shaft 20, and is caused to press at its ends against the inner edges of the respective pawls 21, 22 behind their heads or engaging portions, thus forcing said heads outwardly radially into engagement with the teeth or lugs 25, 26 and effecting an operative engagement with the spool whereby said spool is turned when the crank is rotated in such forward direction. It will be noted the spool is thus turned rearwardly, to wind the line thereon from above. In order to limit free turning movement of the hub 24 in the recess of the spool, a clamp 28 is mounted on and circumferentially of said hub and is formed with an arm 29 projecting radially of and beyond the arbor of the spool. The arm 29 is adapted for engagement with a stop pin 30 carried by the bracket 16 and also with a pin 31 carried by the disk or head 10 substantially opposite said pin 30. When the crank is turned manually as above described, the cam 27 by its engagement with the pawls 21, 22 causes the hub 24 to be turned therewith and with the spool, and the clamp member 28 is also turned, in the direction of the arrow $a$ until its arm 29 engages the pin 30 as shown in Figure 5, and thereafter said clamp member is held against rotation and slides on the periphery of the hub. When reverse movement of the shaft 20 occurs the cam 27, moving in the direction of the arrow $b$ in Figure 6, engages the opposite or tail ends of the pawls 21, 22 and oscillates them on their fulcrums 23 and causes them to be disengaged from the teeth or lugs 25, 26 so that the spool 13 may turn freely, being then entirely independent, so far as rotation is concerned, of the shaft 20 and winding mechanism. Reverse movement of the shaft 20 and cam 27 at first causes the hub 24 to be turned reversely, through engagement of said cam with the pawls, and the arm 29 is carried from the pin 30 to engagement with the pin 31 as shown in Figure 6, and thereafter the hub, and with it the cam and pawls, are held against further reverse movement by the action of the clamp member 28. The mechanism thus far described, with certain minor changes, is common and well known and the back action of the cam to release the spool is commonly obtained by outward movement of the fishing line relative to the spool, as induced for instance in making a cast. I have provided means for positively producing the release of the spool without reference to the travel of the line, thus leaving the spool and line entirely free and unobstructed and producing no friction or drag thereon in making the cast.

The inner face of the gear 16 is formed with a relatively large circular recess 32, preferably undercut, in which is mounted a friction spring 33 substantially annular in shape, said spring being mounted loosely but having frictional contact with the wall of the recess. One end of the spring 33 is turned outwardly to form a post or stud 34, projecting beyond the face of the gear 16 and through a notch 35 formed in one wall of the bracket 15, and movement of said spring in the recess is limited in both directions by contact of said post with the respective end walls of said notch. A retractile coil spring 36 is fixed at one end to the post or stud 34 of the friction spring and at its opposite end to the upper end of the bracket 15, as by means of an eye or loop 37. It is the tendency of the spring 36 to hold the post or stud 34 of the friction spring in contact with the upper wall of the notch 35, and to return it to such position when turning force is released from the crank, such position being shown in Figure 6. However, when manual force is applied to the crank 18 to turn it forwardly, in such manner as to wind a line on the spool, the spring 36 yields and permits the post or stud 34 to travel into contact with the lower wall of the notch 35 as shown in Figure 5, the force of the friction spring 33 being sufficient to hold it in operative engagement with the wall of the recess 32 in the rotating gear 16 against the action of said spring 36. When the post or stud 34 engages the lower wall of the notch the spring 33 is held against further rotation and thereafter it slides freely and circumferentially in the recess 32 so long as the gear is rotated through turning of the crank. Upon release of the crank, as for the act of making a cast, or preparatory thereto, the spring 36 at once pulls upon the friction spring 33 and moves said spring and with it the gear 16 reversely or in the direction of the arrow $c$ in Figure 6. This reverse movement, which is limited by contact of the stud or post 34 with the upper wall of the notch 35, is quick and sudden and is communicated to the pinion 19 and shaft 20 and by the latter to the cam 27, causing said cam to act to disengage the pawls 21, 22 from the spool and permit free and unobstructed reverse movement of said spool and paying out of the line wound thereon. The backward movement of the cam 27, pawls 21, 22 and hub 24, although ample to insure the disengagement of the pawls from the teeth or lugs of the spool, is limited by engagement of the arm 29 of the clamp with the stop pin 31, after which said cam, pawls and hub are held against further movement regardless of the continued reverse rotation of the spool. The backward snap action induced by the retractile spring 36 provides a positive and quick-acting means for releasing the spool, without dependence upon paying out of the line, and greatly facilitates the operation of making a cast, and in addition the spring 36 continues to apply force preventing accidental re-engagement of the pawls with the spool. Because of this positive releasing means, I am further enabled to provide the pawls 21, 22 with square faces in engagement with square faces of the teeth or lugs 25, 26, on lines substantially radially of the device, rather than the rounded engaging faces heretofore used to facilitate the action of said pawls in slipping off said teeth or lugs when a cast is made. My improved construction thus insures a more perfect operative engagement of the pawls with the spool and the parts are not subject to such wear as will cause the engaging parts to become inoperative.

The level-wind reel of common form also includes a carriage shaft 38 arranged across the front of the device and journaled in a bearing 39 at one end and in a housing 40 at the opposite end, said bearing and housing being mounted on the cylindrical frame of the reel and being connected by a bar 41 extending longitudinally just above the shaft 38. The housing 40 communicates with the interior of the skeleton frame adjacent the head plate 10 and contains a gear 42 fixed to the shaft 38 and meshing with and adapted to be driven by the gear 16, whereby said shaft 38 is rotated to the rear when the hand crank 18 is manually rotated in a forward direction. The carriage shaft 38 is formed with oppositely inclined spiral grooves 43, 44 in its periphery extending the major portion of the length of the shaft and communicating with each other at each end, said grooves crossing each other at oblique angles at frequent intervals as shown. The communicating portions of the grooves 43, 44 preferably are arranged on arcs and are shown at one end of the shaft in Figures 1 and 3 and designated by the numeral 45. A level-wind carriage 46 of common form is mounted on the shaft 38 and is adapted for rotary oscillation thereon to a limited degree and also for travel longitudinally of the shaft. The carriage 46 is formed with a fork or notch 47 at its free end, which end projects upwardly when the carriage is in operative or winding position, as shown in Figure 1 and by solid lines in Figure 5, with the fork or notch 47 projecting across the periphery of the arbor of the spool 13 and adapted to guide a line being wound thereon and lay said line in even or "level" windings on said spool, as said carriage travels longitudinally of the shaft 38 and in sliding contact with the bar 41. The carriage is also adapted to be oscillated forwardly on the shaft 38 to substantially horizontal position as indicated by dotted lines in Figure 5, which is the correct position for said carriage when the line is paying out from the spool as in the act of casting, so that said line is unobstructed by any contact with said carriage. The carriage 46 is formed on its normally forward side with a recess 48 opening to the bore by which said carriage is pivotally mounted on the shaft 38. The recess 48 is closed by means of a plate 49 held in place by a screw 50, and an elongated pawl 51 is mounted in said recess, enters one or another of the grooves 43, 44 or 45 and is formed with a stem 52 projecting through said plate 49. Rotation of the shaft 38 causes the pawl to be moved lengthwise of the inclined grooves 43, 44 and arcuate grooves 45, so that the carriage is carried successively from one end to the other of the said shaft as said pawl travels in the spiral grooves, and to reverse its movement at each end of the shaft as the pawl passes through one or another of the arcuate grooves 45 from one spiral groove to the other. When the notch or fork 47 of the carriage is in engagement with a line being wound upon the spool 13, such movement of the carriage causes the line to be laid in even or level layers on the spool. According to my improvement each of the spiral grooves 43, 44 is formed at its bottom with a special track groove 53 which is angular, preferably substantially V-shaped in cross-section, and the lower face of the pawl 51 is formed to fit snugly within said V-shaped groove as clearly shown in Figure 2, and is pressed into engagement therewith by means of a spring 54 wound on the stem 52 thereof and abutting the top of said pawl and also the under surface of the plate 49. It is the function of the V-shaped spiral grooves, and the close fitting of the traveling pawl therein, to guide said pawl in its travel and cause it to continue in its proper course throughout the length of either of said spiral grooves and to overcome the tendency found in devices of this character for the pawl, especially after the parts have become somewhat worn, to catch on one of the points caused or formed at the crossing of the spiral grooves and thus lock the carriage and prevent proper operation. The V-shaped portion of the grooves is omitted in the arcuate grooves 45, thus permitting the pawl to turn through an arc in passing from one spiral groove to another. In devices of this kind heretofore in use, dependence is placed upon the outward movement of the line from the spool, as in making a cast, to carry the carriage forwardly to the position indicated by dotted lines in Figure 5, so that the line is freed from the notch or fork of said carriage. This necessarily caused some drag or hesitation in the travel of the line, and I have overcome this difficulty by the backward snap action of the spring devices hereinbefore described, which is communicated through the gear 16 and gear 42 to the shaft 38 as well as to the release of the free-spool mechanism. Pressure of the spring 54 serves, in addition to the function before mentioned, to produce a frictional contact between the shaft 38 and carriage 46 so that said carriage is carried forwardly to releasing position when said shaft is rotated as just set forth, forward movement of said carriage being limited by contact of its base with a forward cross-bar 12 of the skeleton frame. Similarly, the friction produced by the spring 54 acts to move said carriage rearwardly and upwardly to operative engagement with the line when the crank is turned to wind the line on the spool, the shaft 38 then being rotated through the gears 16 and 42 to cause back and forth travel of the carriage as already indicated.

It is obvious that the spring-actuated snap reverse action may be employed in a reel equipped with either the free-spool or the level-wind features independently of the other, as well as in one in which both features are employed.

I have also provided means to prevent, or at least greatly reduce, the tendency at times of the line to "pile up" at one point on the spool, during the interim between the initiation of the winding in operation and the time when the line is engaged by the carriage 46 and received within the notch thereof. It sometimes occurs that the winding-in operation starts just as the carriage is starting its return trip from that end of the spool near the head or disk 11, in which event it will be necessary, in case the line misses the notch 47, for the carriage to make a complete round trip before the line is engaged. Considering the manner in which these mechanisms are usually geared, this means that as many as twenty-two strands of the line will be laid on the spool near one end thereof, which is an objectionable piling up and seriously interferes with the level wind function. To partially overcome this I have shown the forward cross-bar, designated by 12ª, as formed with an arcuate upper margin as clearly shown in Figure 1, of concave form, so that the tendency of the line being wound in, when not engaged by the carriage, is to travel down the inclined face of the bar toward the center of the spool, thus spreading the unguided winding over approximately one-half the length of the spool, and also causing the carriage to pick up the line at about the middle of the spool rather than when it has returned to the end near the plate 11. To further overcome the objectionable tendency, I have made the carriage 46 wider than is commonly done and formed its upper or outer side margins on inclined lines, such lines extending down to a horizontal plane substantially coincident with the plane of the lowest point of the curved surface of the bar 12ª. The carriage being wider, engages the line more quickly, and the line is forced up between the curved surface of the bar and the inclined face of the carriage, and caused to be level wound at an earlier point than would otherwise be. By this arrangement I can overcome, or at least greatly reduce, the tendency of the unguided line to pile up on the spool.

I claim as my invention—

1. In a fishing reel, a frame, a winding shaft journaled therein, a crank on said shaft, a winding gear fixed to said shaft, a member mounted for rotation in said frame, means connecting said rotary member with said winding gear whereby said member may be rotated in one direction when said crank is turned manually, a friction spring engaging said winding gear, means to limit rotation of said spring with said gear in both directions, and a retractile spring connected with said friction spring and with said frame and acting to produce a snap reverse movement of said winding gear and of said rotary member when force is released from said crank.

2. In a fishing reel, a frame, a winding shaft journaled therein, a crank on said shaft, a winding gear fixed to said shaft, a spool mounted for free rotation in said frame, a countershaft journaled in said frame axially of said spool, a pinion on said countershaft meshing with said gear, said spool being formed with internal ratchet lugs, pawls pivotally mounted and adapted for engagement with said lugs to turn the spool in one direction, a cam on said countershaft adapted to engage and actuate said pawls to both operative and inoperative positions, and spring devices connecting with and acting on said winding gear to produce a limited reverse movement and cause said cam to move the pawls to disengaged position.

3. In a fishing reel, a frame, a winding shaft journaled therein, a crank on said shaft, a winding gear fixed to said shaft, a spool mounted for free rotation in said frame, a countershaft journaled in said frame axially of said spool, a pinion on said countershaft meshing with said gear, said spool being formed with internal ratchets, pawls pivotally mounted and adapted for engagement with said ratchets to turn the spool in one direction, a cam member fixed to said countershaft adapted to engage and actuate said pawls to both operative and inoperative positions, said winding gear being formed with a circular recess, a substantially annular friction spring mounted in said recess and frictionally engaging said gear, means to limit movement of said spring with said gear in both directions, and a retractile spring fixed at one end to said friction spring and tending to cause a quick reverse movement thereof and of said winding gear when winding force is relieved, whereby said cam is caused to positively actuate and disengage said pawls.

4. A fishing reel, comprising a frame, a winding shaft journaled therein, a crank on said shaft, a winding gear fixed to said shaft, a spool mounted for free rotation in said frame, a countershaft journaled in said frame axially of said spool, a pinion on said countershaft meshing with said winding gear, a positive clutch means for operatively connecting said spool with said countershaft to rotate said spool in one direction when said crank is turned, and tension means acting on said winding gear to positively release said operative engagement when pressure is released from said crank.

5. In a fishing reel, a frame, a winding shaft journaled therein, a crank on said shaft, a winding gear fixed to said shaft, a spool mounted for free rotation in said frame, a countershaft journaled in said frame axially of the spool, ratchet and pawl clutch means for operatively connecting said spool with said countershaft to rotate said spool when said crank is turned in one direction, and spring devices connected with and acting on said winding gear to produce a limited reverse movement and a positive release of said operative connections with the spool.

6. In a fishing reel, a frame, a winding shaft journaled therein, a crank on said shaft, a winding gear fixed to said shaft, a member mounted for free rotation in said frame, ratchet and pawl clutch connections between said winding gear and rotary member to turn the latter in one direction, a cam for actuating said clutch connections in both directions, and a spring connected with and adapted to act upon said gear to move said cam and produce a limited reverse movement when force is released from said crank, whereby the clutch connections are positively released to permit free movement of said rotary member.

7. In a fishing reel, a frame, a winding shaft journaled therein, a crank on said shaft, a member mounted for rotation in said frame, a gear for imparting rotary movement to said rotary member releasable clutch connections between said gear and said rotary member, a winding gear on said shaft meshing with the first mentioned gear, said winding gear being formed with a substantially circular recess, a friction spring mounted in said recess and frictionally engaging said winding gear, said spring being turned laterally at one end to form a post, means to limit movement of said post, and a retractile spring fixed at one end and attached at the other end to said post and tending to cause a quick reverse movement of said friction spring and winding gear when winding force is released from said crank and whereby a limited reverse movement is communicated to said rotary member and whereby said clutch connections are released.

Signed at Des Moines, in the county of Polk and State of Iowa, this 14th day of June, 1924.

JOE KAUTZKY, Jr.